(12) United States Patent
Sakane

(10) Patent No.: US 8,078,363 B2
(45) Date of Patent: Dec. 13, 2011

(54) ON-VEHICLE ELECTRONIC DEVICE CONTROL SYSTEM

(75) Inventor: Hiroyuki Sakane, Anjo (JP)

(73) Assignee: Denso Corporation, Kariya (JP)

( * ) Notice: Subject to any disclaimer, the term of this patent is extended or adjusted under 35 U.S.C. 154(b) by 704 days.

(21) Appl. No.: 12/199,281

(22) Filed: Aug. 27, 2008

(65) Prior Publication Data

US 2009/0062979 A1     Mar. 5, 2009

(30) Foreign Application Priority Data

Aug. 29, 2007 (JP) ................................ 2007-223074

(51) Int. Cl.
    G06F 7/00       (2006.01)
    G06F 19/00      (2011.01)
(52) U.S. Cl. ............................................ 701/48; 701/36
(58) Field of Classification Search ............... 701/1, 36, 701/48, 31
    See application file for complete search history.

(56) References Cited

U.S. PATENT DOCUMENTS

| | | | | |
|---|---|---|---|---|
| 5,369,584 | A * | 11/1994 | Kajiwara | 701/48 |
| 6,154,688 | A * | 11/2000 | Dominke et al. | 701/1 |
| 6,553,297 | B2* | 4/2003 | Tashiro et al. | 701/48 |
| 6,654,648 | B2* | 11/2003 | Nada et al. | 700/19 |
| 6,810,314 | B2 | 10/2004 | Tashiro et al. | |
| 7,047,117 | B2* | 5/2006 | Akiyama et al. | 701/48 |
| 2006/0111825 | A1 | 5/2006 | Okada et al. | |
| 2007/0156310 | A1* | 7/2007 | Hirano et al. | 701/29 |

FOREIGN PATENT DOCUMENTS

| | | |
|---|---|---|
| JP | 2001-111559 | 4/2001 |
| JP | 2004-045291 | 2/2004 |
| JP | 2004-262332 | 9/2004 |

OTHER PUBLICATIONS

Japanese Office Action dated Jun. 11, 2009, issued in corresponding Japanese Application No. 2007-223074, with English translation.

* cited by examiner

Primary Examiner — David Dunn
Assistant Examiner — Philip Gabler
(74) Attorney, Agent, or Firm — Nixon & Vanderhye P.C.

(57) ABSTRACT

An on-vehicle electronic device control system includes a base-device-layer on which base-inputting-devices and base-driven-devices are disposed and plural control layers on which plural control units are disposed. Each of the control units has a lower-to-higher-layer-data-input-portion for inputting data from a lower layer and a higher-to-lower-layer-data-output-portion for outputting control-command-data to a lower layer. At least one of the control units disposed on one of the control layers has a higher-to-lower-data-input-portion for inputting data from a higher layer. At least one of the control units disposed on one of the control layers has a lower-to-higher-data output-portion for outputting data to a higher layer and one of the control units that has the higher-to-lower-data-input-portion functions as a coordinative-control-command-unit that determines output data based on both data inputted thereto from a higher layer and input data from a lower layer and also functions as an autonomous-control-command-unit that determines the output data based only on the input data from the lower layer if the input data from the higher layer are stopped.

19 Claims, 7 Drawing Sheets

ON-VEHICLE ELECTRONIC DEVICE CONTROL SYSTEM

CROSS REFERENCE TO RELATED APPLICATION

The present application is based on and claims priority from Japanese Patent Application 2007-223074, filed Aug. 29, 2007, the contents of which are incorporated herein by reference.

BACKGROUND OF THE INVENTION

1. Field of the Invention

The present invention relates to an electronic equipment control system that is mounted in a vehicle.

2. Description of the Related Art

The number of various kinds of electronic devices that are mounted in a vehicle to provide various kinds of functions has increased year by year. In order to effectively utilize the functions, it has been required interface structures. In order to meet demand for inexpensive devices having high performance, system sharing among various vehicles and coordination among various systems have been adopted. For example, JP-A-2006-142994 discloses a hierarchical system architecture, in which various kinds of system hardware and software are formed into an application layer that includes coordinating control logic or the like by stacking hardware physical layer on which front-end devices are disposed and a system-infrastructure-layer that masks the hardware structure.

In the above hierarchical system architecture the following operations are carried out: the input data from the hardware physical layer is delivered one after the other from lower layers to higher layers; a process of reducing the data into control output data for the hardware physical layer is carried out in the application layer, and the result of the processes that are carried out in the application layer is delivered one after the other from the higher layers to the lower layers; and finally, driving data are delivered from the hardware physical layer. The input data of one layer are processed in the same layer before delivering to the next higher layer to be processed. Then, the data processed in the higher layer is delivered to the lower layer as a process result. That is, the input and output data that are exchanged between a lower layer and higher layers are closely related to the input and out data of the higher layers. In other words, the control data are not confined in each layer. As a result, if some coordination related trouble occurs in one of the layers, such trouble may spread over the higher and lower layers of the above hierarchical system architecture and various portions of each layer thereof.

SUMMARY OF THE INVENTION

Therefore, an object of the invention is to provide an improved on-vehicle electronic device control system in which a coordination related trouble is prevented from spreading over other layers even if it occurs in one layer.

Another object of the invention is to provide an improved on-vehicle electronic device control system that can readily separate a layer of a coordination related trouble or overcome the trouble.

According to a feature of the invention, an on-vehicle electronic device control system includes a base device layer on which a plurality of base inputting devices and a plurality of base driven devices are disposed, a first control layer which is disposed higher than the base device layer and includes a plurality of first control units, a second control layer which is disposed higher than the first control layer and includes a plurality of second control units and a third control layer which is disposed higher than the second control layer and includes at least one third control unit, wherein: (1) each of the control units disposed on a first one of the control layers has a lower-to-higher-layer control-command data input portion for inputting data from a layer that is lower than said first one of the control layers and a higher-to-lower-layer control-command data output portion for outputting control-command data to a layer that is lower than said one layer; (2) at least one of the control units disposed on a second one of the control layers has a higher-to-lower-layer control-command data input portion for inputting data from a layer that is higher than the second one of the control layers; (3) at least one of the control units disposed on third one of the control layers has a lower-to-higher-layer control-command data output portion for outputting data to a layer that is higher than the third one of the control layers; and (4) one of the control units that has the higher-to-lower-layer control-command data input portion functions as a coordinative control-command unit that determines data to be outputted from the higher-to-lower-layer control-command data output portion thereof based on both data inputted to the higher-to-lower-layer control-command data input portion thereof and data inputted to the lower-to-higher-layer control-command data input portion thereof, and also functions as an autonomous control command unit that determines data to be outputted from the higher-to-lower-layer control-command data output portion thereof based only on the data inputted to the lower-to-higher-layer control-command data input portion thereof if the data to be inputted to the higher-to-lower-layer control-command data input portion thereof are stopped.

Therefore, the base driven devices can be operated by coordinative control of a plurality of the control units and base inputting devices, and can be autonomously operated by the control units that are disposed on control layers lower than the higher hierarchical control layer even if the control units of a higher hierarchical control layer fails without spreading over the higher and lower layers of the hierarchical system architecture and various portions of each layer thereof.

In the above on-vehicle electronic device control system: the lower-to-higher-layer control-command data output portion of one of the control units disposed on one of the control layers may distribute output data to the lower-to-higher-layer control-command data input portion of another control unit disposed on a layer higher than said one of the control layers; each of the control layers may include at least one control unit that has both the higher-to-lower-layer control-command data input portion and the lower-to-higher-layer control-command data output portion: the coordinative control-command unit may includes an arbitration unit that exclusively arbitrates to give a priority to one of the higher-to-lower-layer control-command data and the lower-to-higher-layer control-command data according to a preset arbitration rule if the higher-to-lower-layer control-command data and the lower-to-higher-layer control-command data compete with each other. In the above on-vehicle electronic device control system, the higher-to-lower-layer control-command data output portion of one of the control units disposed on one of the control layers may distribute output data to the higher-to-lower-layer control-command data input portion of another control unit disposed on a layer lower than the one of the control layers.

If base device control-command data and lower-to-higher-layer control-command data compete each other, the arbitration unit may give a priority to the base device control-command data to be inputted to the control unit that controls the base-driven devices. Therefore, a user can manually control the base-driven devices if the user feel something strange on the base-driven device.

At least one of the base inputting devices may include a manipulating device by which a user provides base inputting data. First one of the control units disposed on the layer next to the base device layer, the base inputting devices and the base driven device may form a base function system. Second and third ones of the control units disposed on layers higher than the control layer on which the first one of the control units is disposed receive, via at least one of the lower-to-higher-layer control-command data input portions, distributed data of the base control input data that are inputted from one of the base inputting devices to the first one of control units and distributed data of the base control-command data that are outputted to the base driven devices to form an automatic control unit that monitors an operating condition of base function system according to the above two distributed data.

The automatic control unit provides the first one of the control units with automatic control-command data as the higher-to-lower-layer control-command data when the operating condition meets a preset condition. The base function system and the automatic control unit form an automatic expanded function system that determines to output the base control-command data only based on the base control-command data if the automatic control-command data inputted to one of the first one of the control units stop due to malfunction of any of the automatic control units.

Another automatic expanded function system is formed from another base function system and another automatic control unit, one of the control units disposed on a layer higher than the layers on which the another automatic expanded function system is disposed may form a coordinative control unit that receives expanded control condition data that are outputted by the automatic control units to output coordinative operation-command data as the lower-to-higher-layer control-command data, thereby forming a coordinative control system with plural automatic expanded function systems.

The automatic control units of the coordinative control system that are included in each the automatic expanded function system may determine the higher-to-lower-layer control-command data only according to the lower-to-higher-control-command data outputted from the base function system if inputting of the coordinative operation-command data stop due to malfunction of any of the coordinative control units.

The coordinative control system may include a first automatic expanded function system and a second automatic expanded function system, one of the base inputting devices and one of the base driven devices disposed in the first automatic expanded function system may be, respectively, a rear defogger switch and a rear defogger embedded in a rear windshield. One of the automatic control units disposed in the first automatic expanded function system may include means for turning off the rear defogger switch if operation time of the rear defogger becomes a preset time. One of the base inputting devices and one of the base driven devices disposed in the second automatic expanded function system may be, respectively, a front defroster switch and a front defroster for blowing warm air to a front windshield, and one of the automatic control units disposed in the second automatic expanded function system includes means for controlling temperature of the warm air according to outside temperature.

The coordinative control unit may provide the first automatic expanded function system with coordinative operation-command data that indicate coordinative operation of the rear defogger if the expanded control condition data from the second automatic expanded system indicate that the defroster is in operation; and the coordinative control unit may provide the second automatic expanded function with coordinative operation command data to operate the defroster as a replacement of the rear defogger if the expanded control condition data of the first automatic expanded function system indicate that the rear defogger is not operating while the rear defogger switch is turned on.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A couple of preferred embodiments according to the present invention will be described with reference to the appended drawings.

An on-vehicle electronic device control system according to the first embodiment of the invention is applied to a control of a defroster and a rear defogger, which will be described with reference to FIGS. 1-6.

Figure 1:
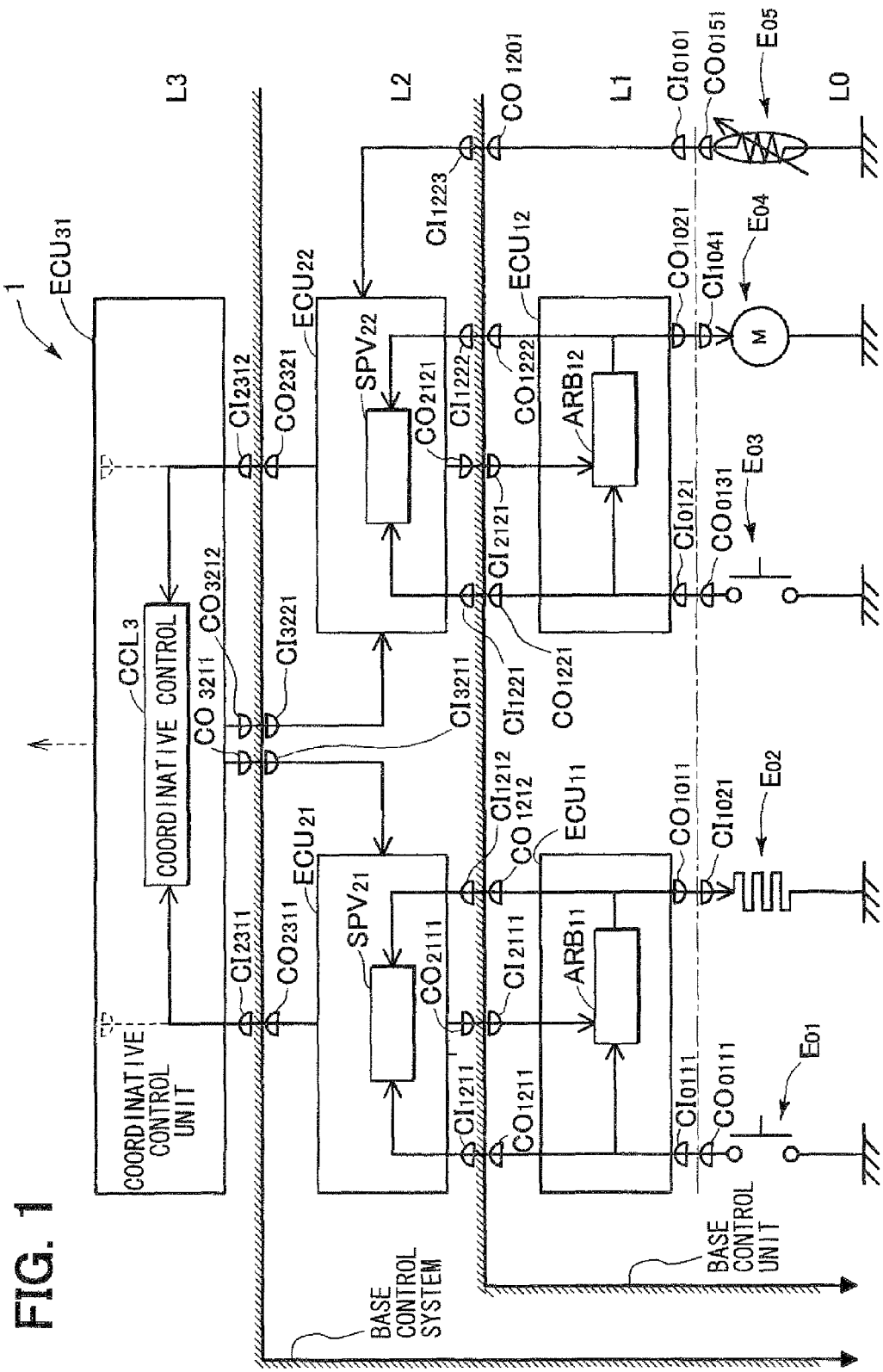
FIG. 1 is a block diagram of an on-vehicle electronic device control system according to the first embodiment of the invention.

As shown in FIG. 1, the on-vehicle electronic device control system 1 includes a base device layer L0 that is disposed at the lowest layer of the system 1, a first control layer L1 that is disposed on the base device layer L0, a second control layer L2 that is disposed on the first control layer L1 and a third layer L3 that is disposed on the second control layer L2.

The base device layer L0 forms a front-end-input unit for a vehicle user and includes base input devices E01, E03 that provide higher control layers with base-control-input data and base-driven-devices E02, E04 that are automatically driven based on base-control-command data that are sent from the higher control layers L1-L3.

The first control layer L1 includes first control units ECU 11, ECU 12, the second control layer L2 includes second control units ECU 21, ECU 22, and the third control layer L3 includes a third control units ECU 31.

Each control unit is formed of a microcomputer and has a lower-to-higher-layer control-command data inputting portion to which control-command data are inputted from a higher control layer and a higher-to-lower-layer control-command data outputting portion from which control-command data are outputted to a device or control unit disposed on the device layer or a lower control layer. In more detail, the first control unit ECU 11 has a lower-to-higher-layer control-command data inputting portion connected with an input connector CI 0111 and a higher-to-lower-layer control-command data outputting portion connected with an output connector CO 1011, the first control unit ECU 12 has a lower-to-higher-layer control-command data inputting portion connected with an input connector CT 0121 and a higher-to-lower-layer control-command data outputting portion connected with an output connector CO 1021, the second control unit ECU 21 has a lower-to-higher-layer control-command data inputting portion connected with an input connector CT 1211 and a higher-to-lower-layer control-command data outputting portion connected with an output connector CO 2111, the second control unit ECU 22 has a lower-to-higher-layer control-command data inputting portion connected with an input connector CI 1221 and a higher-to-lower-layer control-command data outputting portion connected with an output connector CO 2121, and the third control unit ECU 31 has a couple of lower-to-higher-layer control-command data inputting portions respectively connected with input connectors CI 2311, CI 2312 and a couple of higher-to-lower-layer control-command data outputting portions respectively connected with output connectors CO 3211, CO 3221.

The base input device E01 is a manually operated rear defogger switch, the base driven device E02 is a rear defogger that is formed of an electric heater embedded in a rear windshield, the base input device E03 is a manually operated front defroster switch, and the base driven device E04 is a defroster that blows warm air toward the inside surface of the front windshield.

Each control unit also includes a higher-to-lower-layer control-command data inputting portion to which control-command data are inputted from a higher control layer and a lower-to-higher-layer control-command data outputting portion from which control-command data are outputted to a higher control layer.

That is: the first control unit ECU 11 has a higher-to-lower-layer control-command data inputting portion connected with an input connector CI 2111 and lower-to-higher-layer control-command data outputting portions respectively connected with output connectors CO 1211 and CO 1212; the first control unit ECU 12 has a higher-to-lower-layer control-command data inputting portion connected with an input connector CI 2121 and lower-to-higher-layer control-command data outputting portions respectively connected with output connectors CO 1221 and CO 1222; the second control unit ECU 21 has a higher-to-lower-layer control-command data inputting portion connected with an input connector CI 3211 and a lower-to-higher-layer control-command data outputting portion connected with an output connector CO 2311; and the second control unit ECU 22 has a higher-to-lower-layer control-command data inputting portion connected with a input connector CI 3221 and a lower-to-higher-layer control-command data outputting portion connected with an output connector CO 2321.

Incidentally, each of the output and input connectors is arranged to be detachable. There are some control command signals that are transmitted from one control layer to another control layer by skipping one or more control layers disposed between two control layers via a connector, such as an input connector CI 0101 and an output connector CO 1201.

The first and second control units ECU 11, ECU 12, ECU 21 and ECU 22, which are disposed on the first and second control layers L1, L2, respectively have higher-to-lower-layer control-command data input portions respectively connected to the connectors CI 2111, CI 2121, CI 3211, CI 3221 and form a coordinative autonomous interchanging control unit that includes an coordinative control command unit and a autonomous control command unit. The coordinative control command unit determines respective output data outputted from the respective higher-to-lower-layer-control command data output portions via the connectors CO 1011, CO 1021, CO 2111 and CO 2121 based on the respective data of the higher-to-lower-layer control-command data input portions inputted via the connectors CI 2111. CI 2121, CI 3211 and CI 3221 and the lower-to-higher-layer control-command data inputted via the connectors CI 0111, CI 0121, CI 1211, CI 1212 and CI 1222. The autonomous control command unit determines data to be outputted to the higher-to-lower-layer control-command data input portions CI 2111, CI 2121, CI 3211 and CI 3221 based on only the data of the lower-to-higher-layer control-command data input portions CI 0111, CI 0121, CI 1211, CI 1212 and CI 1222 if the transmission of data to be inputted to the higher-to-lower-layer control-command data input portions CI 2111, CI 2121, CI 3211 and CI 3221 is stopped.

The lower-to-higher-layer control-command data output portions of the first control units ECU 117 ECU 12 deliver the input data that are inputted, via the connectors CI 0111 and CI 0121, to the second control units ECU 21, ECU 22. The higher-to-lower-layer control-command data output portion of the first control unit ECU 011, ECU 012 distribute the output data that are outputted to the second control units ECU 21, ECU 22 via the connectors CO 1211, CO 1221 to the base device layer L0 as the higher-to-lower-layer control-command data.

The first control units ECU 11, ECU 12 respectively includes arbitration units ARB 11 and ARB 12 as coordinative control command units. If the input data of the higher-to-lower-layer control-command data output portions CO 1011, CO 1021 and the input data of the lower-to-higher-layer control-command data output portions CO 1211, CO 1221 conflict with each other when the data of the higher- to lower-layer-control command data portions outputted via the connectors CO 1011, CO 1021 are determined, the arbitration units ARB 11 and ARB 12 exclusively arbitrate according to a preset rule. Incidentally, the arbitration units ARB 11, ARB 12 are usually formed as software.

The first control units ECU 11, ECU 12 respectively form base device control units to which base-device-control input data are inputted from the base inputting devices (the rear defogger switch and the front defroster switch) E01, E03, and the arbitration units ARB 11, ARB 12 arbitrate so that the base device control data can be inputted to the first control units ECU 11, ECU 12 if the base-device-control input data and the lower-to-higher-layer control-command data are inputted to the first control units ECU 11, ECU 12.

An automatic expanded function system is provided for each of the rear defogger and the defroster, and the third control unit ECU 31, which is connected to the respective automatic expanded function systems, receives expansion control condition data related to base device control conditions from each of the higher-to-lower-layer control-command data input portions of the second control units ECU 21 and ECU 22 via the connectors CI 2311 and CI 2312. The third control unit ECU 31 is a coordinative control unit that provides coordinative-operation-command data, as the control-command data respectively from its two higher-to-lower-layer control-command data output potions via the connectors CO 3211, CO 3212 based on the respective expanded control condition data outputted from the respective second control units ECU 21 and ECU 22. The coordinate control unit form a coordinative control system together with the above automatic expanded function systems.

Figure 3:
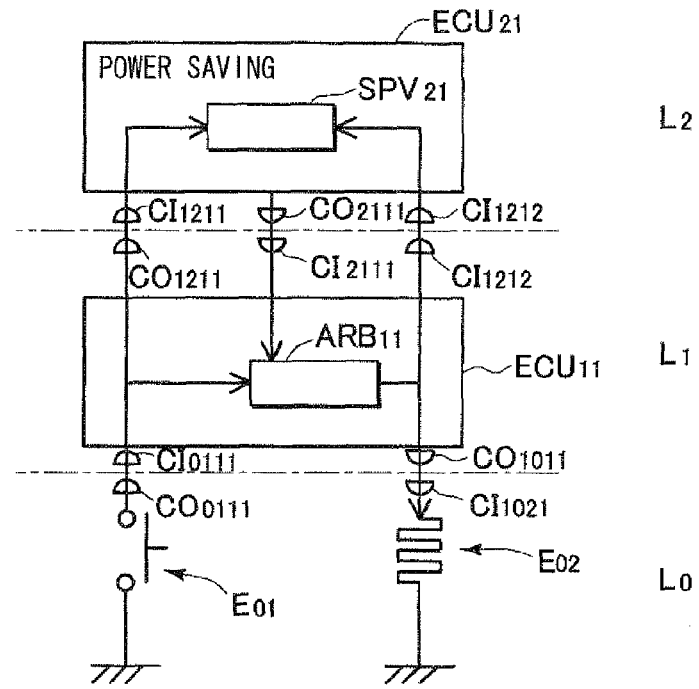
FIG. 3 is a block diagram showing an operation of the on-vehicle electronic device control system shown in FIG. 1 when it is degenerated to a first automatic expanded function.
Figure 4:
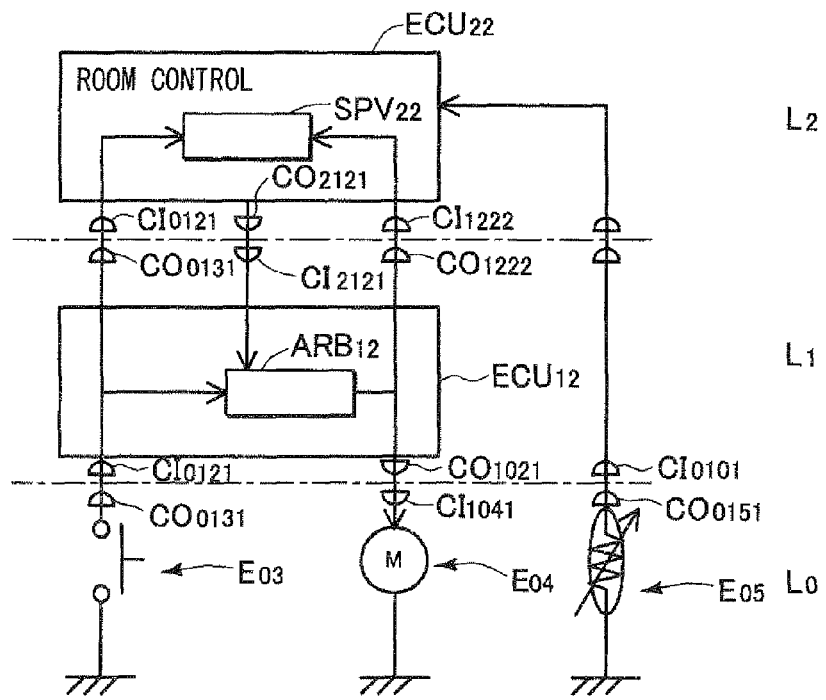
FIG. 4 is a block diagram showing an operation of the on-vehicle electronic device control system shown in FIG. 1 when it is degenerated to a second automatic expanded function.
Figure 5:
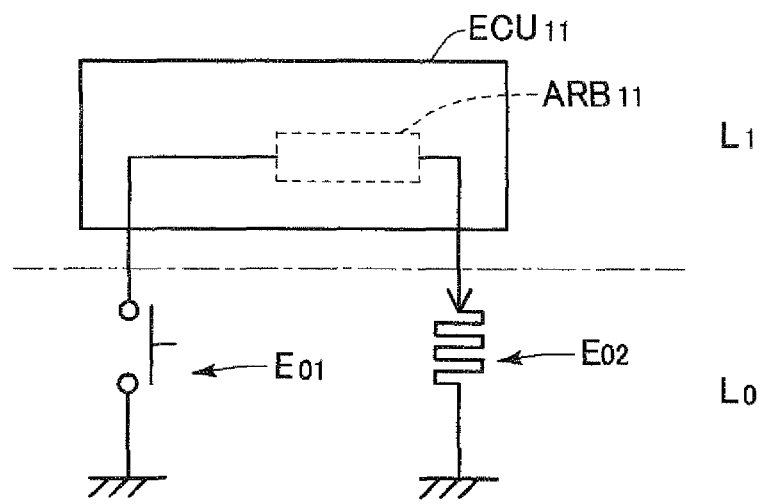
FIG. 5 is a block diagram showing a state of the on-vehicle electronic device control system shown in FIG. 1 when it is degenerated to a first basic function.
Figure 6:
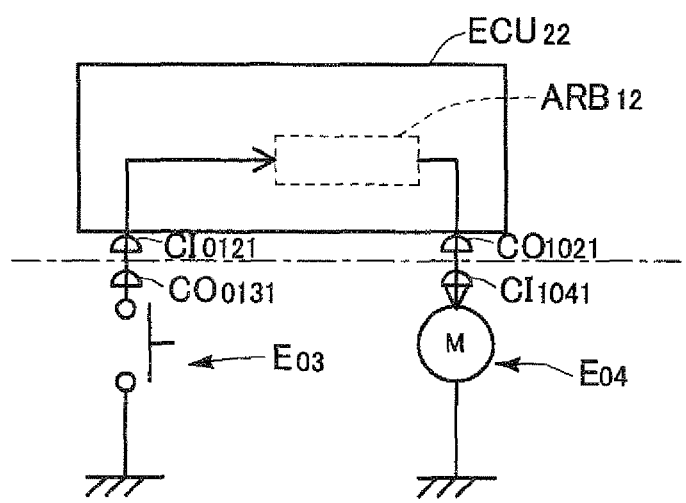
FIG. 6 is a block diagram showing a state of the on-vehicle electronic device control system shown in FIG. 1 when it is degenerated to a second basic function.

Each of the first control units ECU 11 ECU 12, as the base device control unit, forms a basic function system that includes the rear defogger switch E01 and the rear defogger E02, as shown in FIG. 5, or a basic function system that includes the front defroster E03 and the defroster E04, as shown in FIG. 6. The base-device-control input data that are inputted to the control units ECU 11, ECU 12 via the connectors CI 0111, CI 0121 are also inputted to the second control units ECU 0213 ECU 022 via connectors CI 1211, CI 1221. The base device control-command data that are delivered to the base driven devices (the rear defogger and the defroster) E02, E04 are also inputted to the second control units ECU 21, ECU 22 via the connectors CI 1212, CI 1222. The second control units ECU 21, ECU 22 respectively include condition monitoring units SPV 21, SPV 22 that respectively function as automatic control units. The condition monitoring units SPV 21, SPV 22 monitor operating conditions of the base devices based on the above base device control-command data inputted via the connectors CI 1211, CI 1212, CI 1221, CI 1222 to provide automatic control-command data as the higher-to-lower-layer control-command data from the higher-to-lower-layer control-command output portions thereof via the connectors CO 2111, CO 2121 to the base driven devices E02, E04 if the operating conditions meet preset conditions. Thus, the base device and the second control units ECU 21, ECU 22 are combined to form an automatic expanded system, as shown in FIGS. 3 and 4.

Thus, respective automatic expanded system for the rear defogger and the defroster are formed, and the third control unit ECU 31 receives expanded control condition data of the second control units ECU 21, ECU 22 that respectively control the base driven devices via the connectors CI 2311, CI 2312. The third control unit ECU 31 forms a coordinative control unit that sends the second control units ECU 21, ECU 22 coordinative-operation command data as the higher-to-lower-layer control-command data based on the expanded control condition data via the connectors CO 3211, CO 3212. The coordinative control unit and the automatic expanded function systems form a coordinative control system.

In the coordinative control system shown in FIG. 1: what is controlled by the first automatic expanded function system is the rear defogger; and what is controlled by the second automatic expanded function system is the defroster. In the first automatic expanded function system, the operating condition of the rear defogger E02 and the manipulated condition of the rear defogger switch E01 are monitored by the control unit ECU 21 via the lower-to-higher-layer control-command data inputted and the lower-to-higher-layer control-command data input portions CI 1211, CI 1212 to examine if the circumstances meet a prescribed condition or not. For example, if the rear defogger switch E01 is not manipulated and operation time of the rear defogger E02 reaches a preset time, the rear defogger E01 is automatically turned off.

In the second automatic expanded function system, the second control unit ECU 22 (as an automatic control unit) controls to automatically turn on the front defroster switch thereby to blow warm air based on outside temperature data that the second control unit ECU 22 obtains from an outside temperature sensor E06 if, for example, the front defroster switch E03 is not manipulated and the defroster E04 is not operated.

When expanded control condition data that are inputted via the connector CI 2312 from the second automatic expanded function system indicates that the defroster E04 is operating, the third control unit ECU 31 (as a coordinative control unit) sends the first automatic expanded function system coordinative operation command data to coordinatively operate the rear defogger via the connector CO 3211, if the rear defogger switch E01 is not manipulated, and the rear defogger E02 is not operating. The power control for the above operation is carried out by a coordinative control engine CCL 3.

When the expanded control condition data (via CI 2311) from the first automatic expanded function system show that the defogger D02 is not operating although the rear defogger switch E01 is turned on, the control unit (coordinative control unit) ECU 31 outputs coordinative operation command data to operate the defroster as an alternative defogger (via CO 3212) to the second automatic expanded function system.

Figure 2:
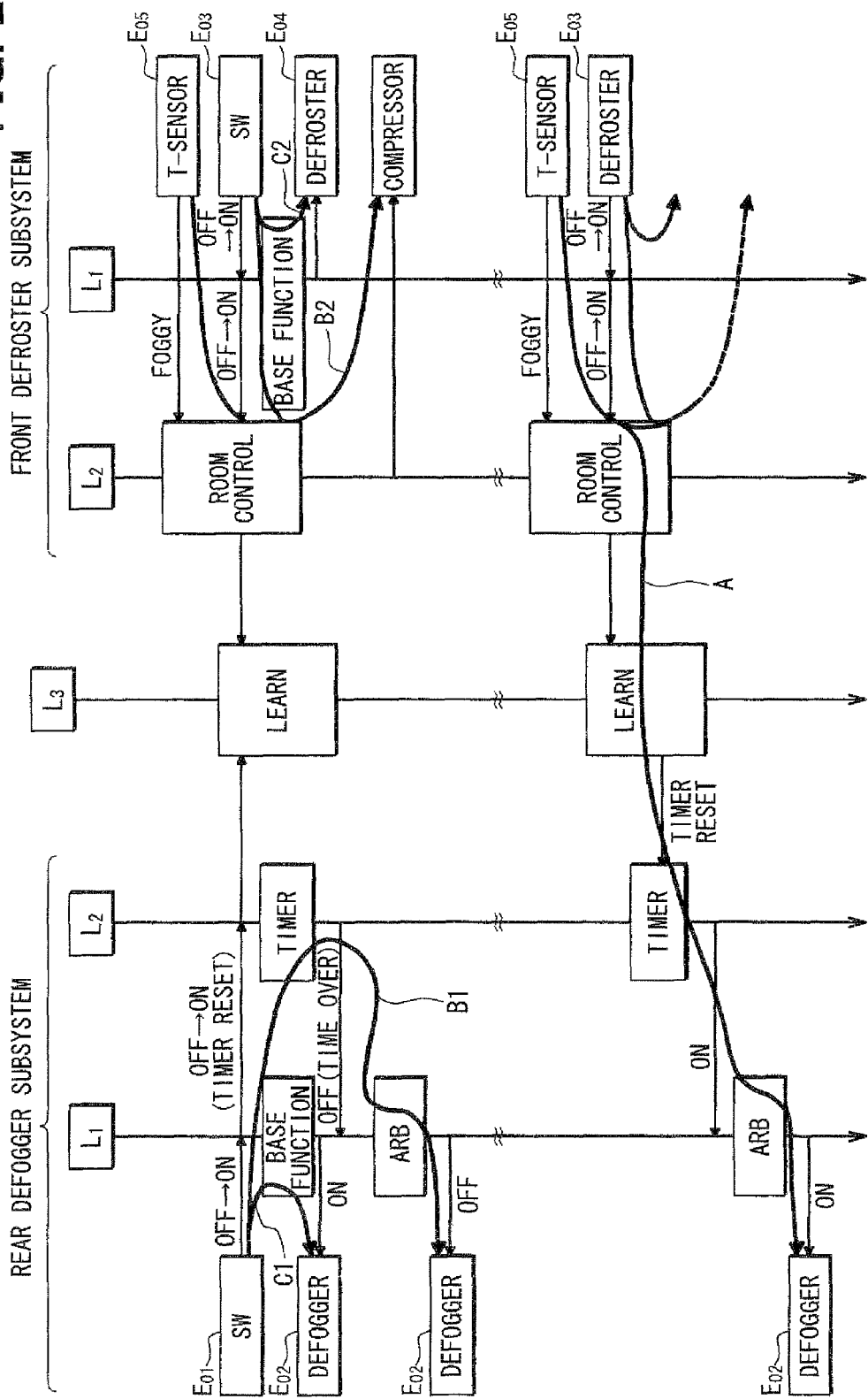
FIG. 2 is a sequence diagram showing flow of the operation of the on-vehicle electronic device control system shown in FIG. 1.

The operation of the on-vehicle electronic device control system 1 will be described with reference to FIG. 2.

In normal operation, the defroster E04 functions as a part of an air conditioning system. It is selected as one of air blow modes of the air conditioning system by turning on the front defroster switch E03. This operation is carried out by the second control unit ECU 21 in the base control system, as indicated by an arrow C2. On the other hand, outside temperature measured by the outside temperature sensor E05 and manipulation history of the defroster switch E03 are recorded into the second control unit ECU 21 of the second automatic expanded function system to learn the conditions for the windshield becoming foggy. If the outside temperature meets any one of the conditions, the control unit ECU 21 automatically turns on the defroster E04 even if the front defroster switch E03 is not manipulated, as indicated by an arrow B2.

The control unit of the base control system ECU 11 starts to drive the rear defogger E02, basically, by turning on the rear defogger switch E01, as indicated by an arrow C1. In the first automatic expanded function system, the second control unit ECU 21 measures operation time of the rear defogger E02 by a timer and turns off the defogger E02 if the operation time becomes a preset time, as indicated by an arrow B1. If however, the rear defogger switch E01 is turned on repeatedly while the rear defogger E02 is operating, the arbitration unit ARB 11 gives a priority to the turning-on manipulation to continue the operation of the rear defogger E02 or resets the timer.

The third control unit ECU 31 of the coordinative control system records the operation history of the defroster E04 and the rear defogger E02 and learns coordinative operation. If it learns that the rear defogger E02 is manipulated more frequently than a prescribed number of times while the defroster E04 is operating, the third control unit ECU 31 gives a command data to the control unit ECU 21 of the first automatic expanded function system to automatically turn on the rear defogger E02, from the next time when the defroster E04 is started. As a result, the rear defogger E02 is controlled by the control unit ECU 11 that is given the command data, as indicated by an arrow A.

Incidentally, if the defroster-coordinated automatic turn-on function of the coordinative control system (arrow A) for the rear defogger E02, and the timer-coordinated automatic turn-off function (arrow B1) of the expanded automatic control system for the rear defogger E02 compete with each other, it may be arbitrated that a priority is given to the automatic turn-off function for power saving (arrow B1) rather than the automatic turn-on function (arrow A) for sensible convenience.

If inputting of the coordinative operation command data via the connectors CI 3211 CT 3221 to the second (automatic) control units ECU 21 and ECU 22 fails due to malfunction of the third (coordinative) control unit ECU 31, the second control units ECU 21 and ECU 22, which are included in the automatic expanded function system, determine the higher-to-lower-layer control-command data to be transmitted via the connectors CI 2111, CI 2121 to the base function system only based on the lower-to-higher-layer control-command data inputted via the connectors CI 1221/CI 1212, CI 1221/CI 1222) from the first (base) control unit ECU 11, ECU 12 of the base function system, as shown in FIGS. 3 and 4, thereby degenerating to a plurality of closed autonomy control systems in each automatic expanded function system. That is, the third control layer L3 that includes the third control unit ECU 31 is separated, so that the control systems that include the first and second device control layers L1, L2 can continuously operate.

If inputting via the connectors CI 2111, CI 2121 to the first control units ECU 11 and ECU 12 fails due to malfunction of the second control units ECU 21, ECU 22 as shown in FIGS. 5 and 6, the first control units ECU 11 and ECU 12 determine the base device control-command data to be transmitted via the connectors CI 1021, CI 1041 to the base function system only based on the base device control-command data, thereby degenerating to closed autonomy control systems. That is, the second layer L2 that includes the second control units ECU 21, ECU 22 are separated, so that the control systems that only include the first device control layer L1 can continuously operate.

An on-vehicle electronic device control system 2 according to the second embodiment of the invention that is applied to a smart entry system will be described with reference to FIGS. 7-8. The on-vehicle electronic device control system 2 includes a base control layer L0 on which base input devices, such as a door knob switch E01, a portable key (wireless switch) E02, a door-lock control switch E03 and a door-lock position detecting switch E05 and base driven devices, such as a modulating-demodulating unit MODEM 112 (in the portable key E02), a door-lock motor E04 and a door-lock-mechanism-side data transmission unit E06, are disposed and three layers L1-L3 on which first control units ECU 11, ECU 12, ECU 13, second control units ECU 21, ECU 22 and a third control unit ECU 31 are disposed. Each of the first, second and third control units ECU 11, ECU 12, ECU 13, ECU 21, ECU 22 and ECU 31 has a lower-to-higher-layer control-command data input portion and a higher-to-lower-layer control-command data output portion. That is, the first control unit ECU 11 has an input connector CI 0111 and an output connector CO 1011, the first control unit ECU 12 has an input connector CI 0121 and an output connector CC 1021, the first control unit ECU 13 has input connectors CI 0131 0132 and an output connector CO 1031, the second control unit ECU 21 has an input connector CI 1211 and an output connector CO 2111, the second control ECU 22 has input connectors CI 1211, CI 1222, CI 1223 and an output connector CO 2121, and the third control unit ECU 31 has input connectors CI 2311, CI 2312, CI 2313, 2314 and output connectors CO 3211. CO 3212, CO 3215.

The base input device E01 is a door knob switch, and the base input device E02 is a portable key for radio communication with a vehicle. The portable key (E02) also functions as a driven device that receives a portable-key-searching radio wave. The portable key (E02) includes a modulating-demodulating MODEM 112 that demodulates a base band signal contained in the portable-key-searching radio wave and a door-lock wireless switch. The modulating-demodulating MODEM 112 sends an answer signal if the base band signal includes a query information, and the door-lock wireless switch sends a door-lock control-command signal based on the switch operation of a user.

The door-lock control switch E03 is formed of a momentary switch that can be controlled via a door key cylinder by a mechanical key. The door-lock position detecting switch E5 is built into a door-lock mechanism. The door-lock-mechanism-side data transmission unit E6 is built into the door-lock mechanism to receive the door-lock control-command wave based on the answer signal of the portable key E02 from the vehicle side control unit ECU 12 and demodulates a door-lock control signal from the door-lock control-command wave. The door-lock-mechanism-side data transmission unit E06 inputs the door-lock control signal in parallel with a door-lock control signal sent from the door-lock control switch E03. The door-lock motor E04 drives the door-lock mechanism.

The first control units ECU 11, ECU 12, ECU 13 that are disposed on the first control layer L1 respectively have higher-to-lower-layer control-command data input portions to which higher-to-lower-layer control-command data are sent from the control units disposed in the second control layer L2 via connectors. In more detail, the first control units ECU 11, ECU 12, ECU 13 respectively have higher-to-lower-layer control-command data input portions, which are respectively connected to connectors CI 2111, CI 2121. CI 2131. The second control unit ECU 21 disposed on the second control layer L2 has a higher-to-lower-layer control-command data input portion to which higher-to-lower-layer control-command data are sent from the third control unit ECU 31 disposed in the third control layer L3 via a connector CI 3211. However, the second control units ECU 22 does not have such an input portion.

The first control units ECU 11 ECU 12, ECU 13 disposed on the first control layer L1 respectively have lower-to-higher-layer control-command data output portions from which lower-to-higher-layer control-command data are sent to the second control units disposed in the second control layer L2 via connectors. In more detail, the first control units ECU 11 has a lower-to-higher-layer control-command data output portion connected to a connector CO 1211 the first control unit ECU 12 has lower-to-higher-layer control-command data output portions respectively connected to connectors CO 1221, CO 1222, and ECU 13 has lower-to-higher-layer control-command data output portions that are respectively connected to the connectors CO 1231, CO 1232, CO 1233. The control units ECU 21, ECU 22 disposed on the second control layer L2 have lower-to-higher-layer control-command data input portions from which lower-to-higher-layer control-command data are sent to the control units disposed in the third control layer L3 respectively via connectors CO 2311, CO 2321.

Figure 7:
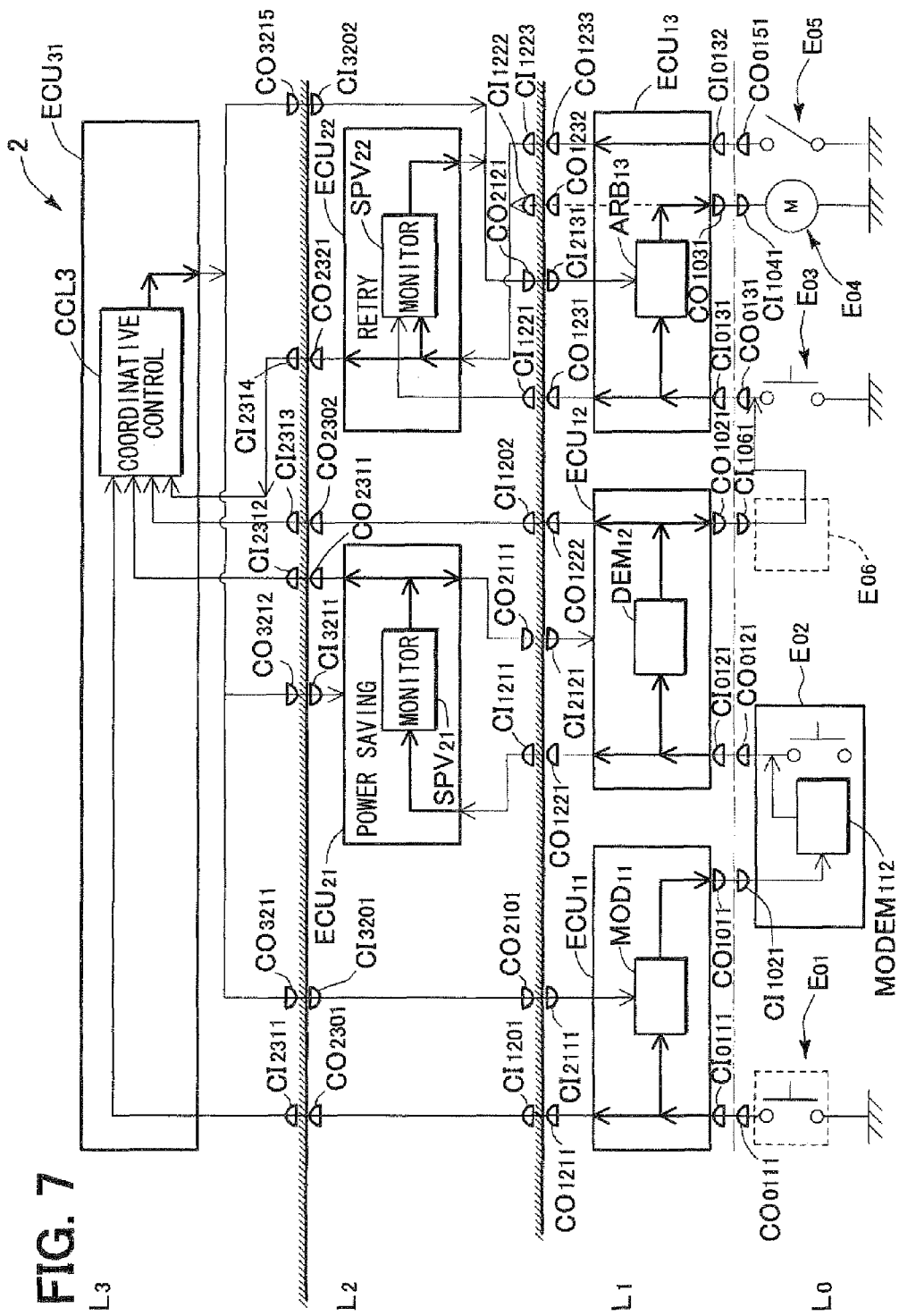
FIG. 7 is a block diagram of an on-vehicle electronic device control system according to the second embodiment of the invention.

The on-vehicle electronic device control system 2 shown in FIG. 7, the first control units ECU 11, ECU 12, ECU 13 disposed in the first control layer L1 and the second control unit ECU 21 disposed on the second control layer L2 form a full input-output control unit. These four control units ECU 11, ECU 12, ECU 13, ECU 21 respectively have the higher-to-lower-layer control-command data input portions and form a coordinative autonomous interchanging control unit. The coordinative autonomous interchanging control unit includes an coordinative autonomous interchanging control unit that includes a coordinative control-command unit and an autonomous control-command unit.

The coordinative control command unit determines respective output data outputted from the respective higher-to-lower-layer-control command data output portions thereof via the connectors CO 1011, CO 1021, CO 1031, CO 2111 based on the respective higher-to-lower-layer control-command data inputted via the connectors CI 2111, CI 2121, CI 2131, CI 3211 and the lower-to-higher-layer control-command data inputted via the connectors CI 0111, CI 0121, CI 0131, CI 1211.

The autonomous control command unit determines the data to be outputted from higher-to-lower-layer control-command data input portions thereof via the connectors CI 2111, CI 2121, CI 3211 and CI 3221 based on only the lower-to-higher-layer control-command data inputted via the connectors CI 0111, CI 0121, CI 0131, CI 1211 if the transmission of data to be inputted via the connectors CI 2111 CI 2121, CI 2131, CI 3211 is stopped.

The lower-to-higher-layer control-command data output portions of the control units ECU 11, ECU 12 disposed in the first control layer L1 that respectively connected to the connectors CO 1211, CO 1221 distribute the input data inputted to the first control units ECU 11 ECU 12 to the second control unit ECU 21, ECU 22, as lower-to-higher-layer control-command data, via the connectors CI 0111, CI 0121. The higher-to-lower-layer control-command data output portions of control units ECU 12, ECU 13 distribute the output data outputted via the connectors CO 1021, CO 1031 from the lower-to-higher-layer control-command data output portions of the control units ECU 12, ECU 13 to the control units disposed in the device layer lower than the first control layer L1 via the connectors CO 1222, CO 1232, as higher-to-lower-layer control-command data.

The control unit ECU 13 includes a control-command arbitration unit ARB 13. The control-command arbitration unit ARB 13, when it determines the higher-to-lower-layer control-command data outputted via the connector CO 1041 as the coordinative control-command unit, exclusively arbitrates to select one of the higher-to-lower-layer control-command data inputted via the connector CI 0131 and the lower-to-higher-layer control-command data inputted via the connector CI 2131 according to a preset arbitration rule if the higher-to-lower-layer control-command data and the lower-to-higher-layer control-command data compete with each other.

The first control units ECU 11, ECU 12, ECU 13 function as base control units to which base control input data are inputted from the base input devices E01, E02. E03, E05. The control-command arbitration unit ARB 13 arbitrate so that the base-device-control input data can be adopted prior to the lower-to-higher-layer control-command data when both the base-device-control input data and the lower-to-higher-layer control-command data are generated.

Figure 9:
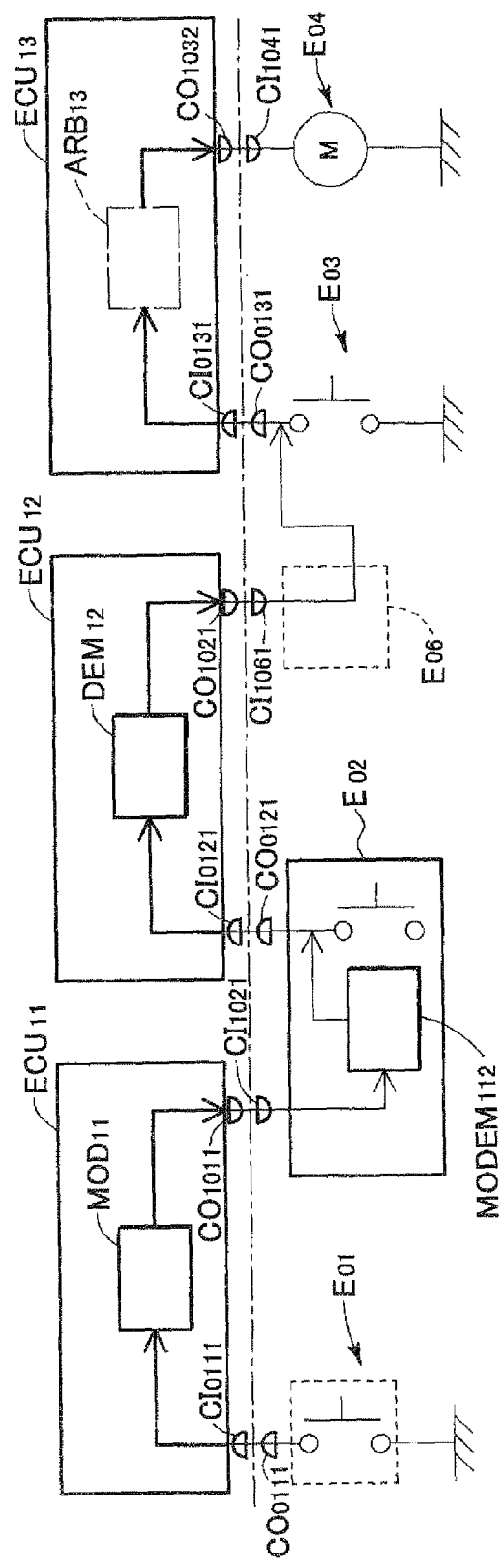
FIG. 9 is a block diagram showing an operation of the on-vehicle electronic device control system shown in FIG. 7 when it is degenerated to a basic function.

The first control units ECU 11. ECU 12, ECU 13 form a base function system together with the base input devices E02, E04 and base driven devices E02, E04, as shown in FIG. 9. The base function system, by itself, can carry out the following functions independently from the systems disposed on the higher control layers L2, L3. The first control unit ECU 11 includes a modulation unit MOD 11. When the first control unit ECU 11 receives, as a trigger signal, a manipulation signal of the door knob switch E01, the modulation unit MOD 11 outputs a key searching radio wave that includes an interrogation signal. The portable key E02 receives this searching radio wave, the modulating-demodulating unit MODEM 112 demodulates the interrogation signal and outputs an answer signal.

The first control unit ECU 12 has a demodulating unit DEM 12 and receives the answer signal of the portable key E02, which includes an answer to the interrogation signal or a door-lock control signal based on manipulation of the wireless switch of the portable key E02. The first control unit ECU 12 demodulates the door-lock control signal and sends a door-lock control command signal to the door-lock-mechanism-side data transmission unit E06.

The first control unit ECU 13 receives the door-lock control signal that is transmitted from the door-lock-mechanism-side data transmission unit E06 or based on the manipulation of the wireless switch of the portable key E02 and sends a drive signal to the door-lock motor E04. The drive signal commands the door-lock motor E04 to lock the door if the door is unlocked and to unlock if the door is locked.

The second control units ECU 21, ECU 22 receive, via the connectors CT 1211, CT 1221, distributed data of the base device control command data that are inputted to the first control units ECU 11, ECU 12, ECU 13 via the connectors CI 0121, CI 0131 and receive, via the connectors CI 1211, CI 1221, distributed data of the base device control-command data that are transmitted via the connectors CI 1061, CI 1041 to the base driven devices E06, E04 as lower-to-higher-layer control-command data. The control units ECU 21, ECU 22 monitor the operating conditions of the base function system by operating condition monitoring engines SPV 21, SPV 22 based on the distributed data of the base device control command data outputted via the connectors CI 0121, CI 0131 and distributed data via the connector CI 1222. If the operating conditions meet preset conditions, the second control units ECU 21, ECU 22 form an automatic control unit to provide, via the connectors CO 2111, CO 2121, the first control units ECU 12, ECU 13 with automatic control-command data as higher-to-lower-layer control-command data to automatically control the base driven devices E06, E04. The base function system and this first control unit that is connected to the base function system are combined to form an automatic expanded function system.

This automatic expanded function system is capable of the following complete operation, which is independent from the third control layer L3. This operation of the expanded function to be added to the base function system shown in FIG. 9 will be described below. The second control unit ECU 21 receives the answer signal from the portable key E02, as distributed data of the base control input data transmitted via the connector CI 1211 and monitors receiving conditions of the answer signal by the operating condition monitoring engine SPV 21. If the second control unit ECU 21 does not receive the answer signal within a preset time period, it sends the first control unit ECU 12 a command signal to stop electric power supply, as the higher-to-lower-layer control-command data transmitted via the connector CO 2111. When the first control unit ECU 12 receives this command signal, the electric power supply to the demodulating unit DEM 12 is stopped (power saving mode). On the other hand, when the answer signal wave is received in the power saving mode, the data of the answer signal wave is distributed to the second control unit ECU 21. The operating condition monitoring engine SPV 21 of the second control unit ECU 21 receives the data of the answer signal wave and sends the first control ECU 12 a command signal for re-supply of the electric power as the higher-to-lower-layer control-command data via the connector CO 2111. Thus, the first control ECU 12 starts supply of electric power to the demodulating unit DEM 12 again.

On the other hand, the second control unit ECU 22 refers to inputting of the door-lock control data transmitted via the connector CI 1221, operation data of the door-lock motor E04 transmitted via the connector CI 1222 and input data relating to present lock position (lock-unlock) data of the lock position detecting switch E05. The second control unit ECU 22 examines, by the operating condition monitoring engines SPV 22, whether the lock-control data form a lock command signal or an unlock command signal and whether the door-lock motor E04 is actually operating or not. If the motor E04 actually operating, the second control unit ECU 22 judges that the command signal that is formed based on the lock control data is consistent or not after confirming the present lock position. If the command signal is not consistent, the control unit ECU 22 sends the control unit ECU 13 a retry command signal, as the higher-to-lower-layer control-command data, via the connector CI 2121. The control unit ECU 13 receives the retry command signal and controls the door-lock motor E04 so that the present position can be changed from one to the other between the lock position and the unlock position.

The third control unit ECU 31, which is disposed in the highest layer of the automatic expanded function system, receives, as the lower-to-higher-layer-control command data, the expanded control condition data that are outputted by the second control units ECU 21, ECU 22 of the base control system to reflect control conditions of the base control systems via the connectors CI 2311, CI 2312, CI 2313, CI 2314. The third control unit ECU 31 forms a coordinative control unit that outputs, as the higher-to-lower-layer control-command data transmitted via the connectors CO 3211, CO 3212, CO 3215, coordinative operation command data commanding the second control units ECU 21, ECU 22 and the first control unit ECU 11 to carry out coordinate operation among the devices of the base control system based on the expanded control condition data. The third control unit ECU 31 also forms a coordinative control system together with the above automatic expanded function systems.

The third control unit ECU 31 includes a coordinative control engine CCL 3 that sends, via the connector CO 2101, the first control unit ECU 11 a polling command signal to detect the portable key E02 around a vehicle at preset intervals. When the first control unit ECU 11 receives the command signal, it outputs a polling signal wave to detect the portable key E02 around the vehicle even when the door knob switch E01 is not manipulated. If the portable key E02 exists in an area that is covered by the polling signal wave, the portable key E02 sends an answer signal, which is received by the control unit ECU 12. When the polling signal wave is outputted, the third control unit ECU 31 sends the second control unit ECU 21, via the connector CO 3212, the coordinative operation command data to reset stopping of power supply so that the first control unit ECU 12 may not be brought into the power saving mode. If the first control unit ECU 12 is in the power saving mode, the control unit ECU 21 sends, via the connector CO 2111, the first control unit ECU 12 a command signal to restart supply of the electric power.

The third control unit ECU 31 can detect whether there is a condition for the portable key E02 to answer the polling signal while the polling signal is being sent from the operating condition monitoring engine SPV 21 of the second control unit ECU 21 via the connector CI 2312. If the user approaches the car and the portable key E02 answers the polling signal, it is possible to lock the door if it has been unlocked or unlock the door (passive unlock) if it has been locked. In this embodiment, an automatic lock control or a passive unlocking control is carried out when the portable key E02 is answering the polling signal with the door knob switch E01 being manipulated.

In more detail, the third control unit ECU 31 detects the present lock position via the connector CI 2314 and outputs an appropriate one of the control-command signals of the automatic locking and the passive unlocking to the first control unit ECU 13, which controls the door lock motor E 04 so that the present position can be changed from one to the other between the lock position and the unlock position. However, in order to operate the key cylinder by a mechanical key prior to the coordinative functions, the arbitration unit ARB 11 gives a priority to the inputting of the door lock switch E03 via the connector CI 0131 if inputting of the door lock switch E03 via the connector CI 0131 and inputting of the control-command signal relating to the automatic locking or the passive unlocking via the connectors CO 3215 and CO 2131 compete each other.

Figure 8:
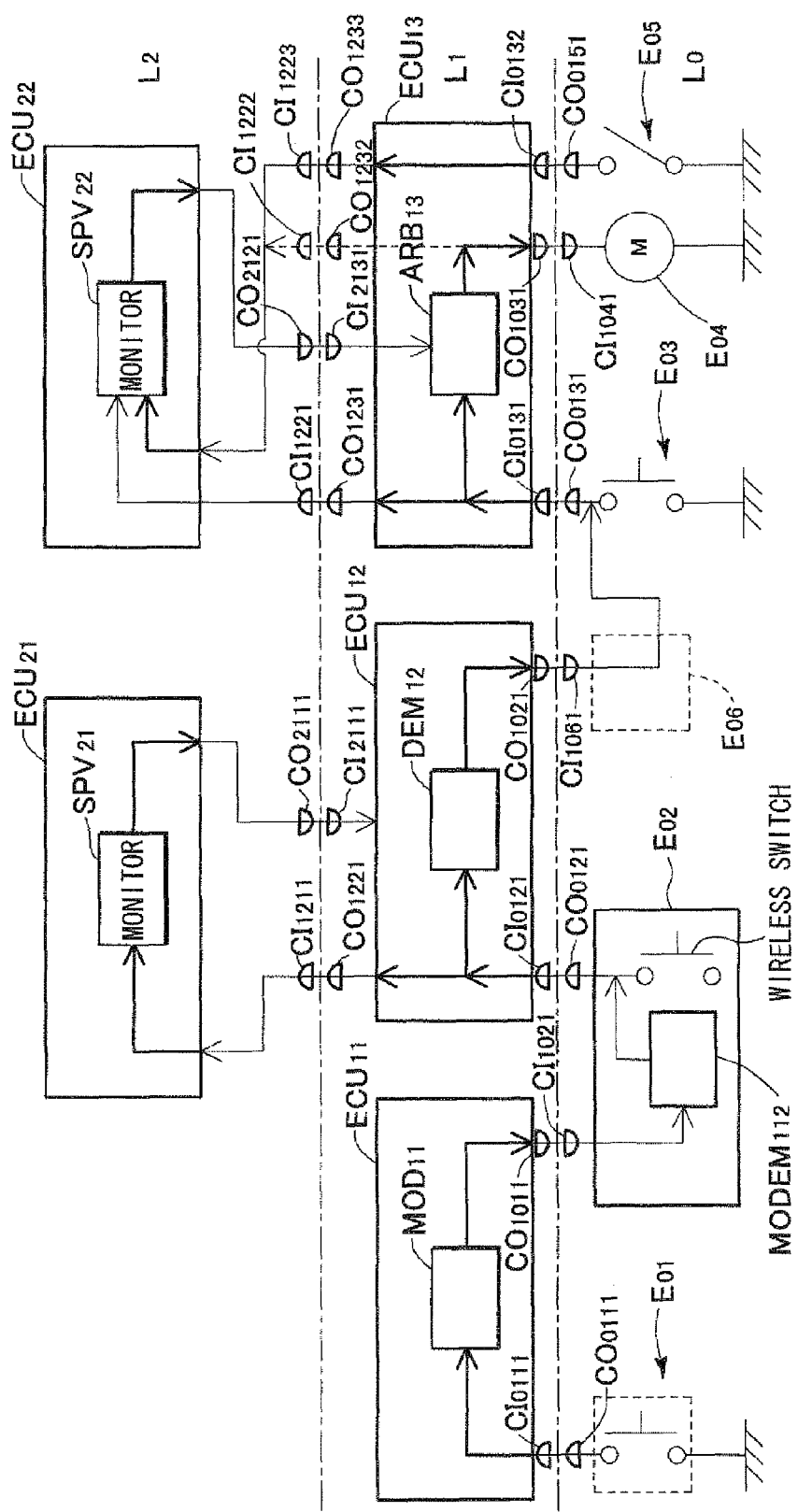
FIG. 8 is a block diagram showing an operation of the on-vehicle electronic device control system shown in FIG. 7 when it is degenerated to an automatic expanded function.

If inputting of the coordinative operation command data to the second control unit ECU 21 via the connectors CI 3211, stops due to malfunction of the third control unit ECU 31, as shown in FIG. 8, the second control units ECU 21 degenerates to a closed autonomy control system in the automatic expanded function system.

If inputting of the higher-to-lower-layer control-command data via the connectors CI 2111, CI 2121 to the first control units ECU 11 and ECU 12 fails due to malfunction of the second control units ECU 21, ECU 22, the first control units ECU 11 and ECU 12 degenerate to closed autonomy control systems. Incidentally, the first control units ECU 11, ECU 12, ECU 13 are cascade-connected with each other by a wireless network in the first control layer L1, and the third control unit ECU 31 is directly connected with the base control units ECU 11. ECU 13. Even if both the second control units ECU 21 and ECU 22 fail, the automatic door locking and the passive unlocking can be carried out without fail as long as the third control unit ECU 31 is normal. In this case, the expanded automatic control function (power saving and retrying) is only stopped.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly. Me description of the present invention is to be regarded in an illustrative, rather than a restrictive, sense.

What is claimed is:

1. An on-vehicle electronic device control system including a base device layer on which a plurality of base inputting devices and a plurality of base driven devices are disposed, a plurality of hierarchical control layers which are disposed higher than the base device layer and each of which includes a plurality of control units, wherein:

each of the control units disposed on a first one of the control layers has a lower-to-higher-layer control-command data input portion for inputting data from a layer that is lower than the first one of the control layers and a higher-to-lower-layer control-command data output portion for outputting control-command data to a layer that is lower than said one layer;

at least one of the control units disposed on a second one of the control layers has a higher-to-lower-layer control-command data input portion for inputting data from a layer that is higher than the second one of the control layers;

at least one of the control units disposed on a third one of the control layers has a lower-to-higher-layer control-command data output portion for outputting data to a layer that is higher than the third one of the control layers; and one of the control units that has the higher-to-lower-layer control-command data input portion functions as a coordinative control-command unit that determines data to be outputted from the higher-to-lower-layer control-command data output portion thereof based on both data inputted to the higher-to-lower-layer control-command data input portion thereof and data inputted to the lower-to-higher-layer control-command data input portion thereof, and also functions as an autonomous control command unit that determines data to be outputted from the higher-to-lower-layer control-command data output portion thereof based only on the data inputted to the lower-to-higher-layer control-command data input portion thereof if the data to be inputted to the higher-to-lower-layer control-command data input portion thereof are stopped; wherein the coordinative control-command unit includes an arbitration unit that exclusively arbitrates to give a priority to one of the higher-to-lower-layer control-command data and the lower-to-higher-layer control-command data according to a preset arbitration rule if the higher-to-lower-layer control-command data and the lower-to-higher-layer control-command data compete with each other;

if base device control-command data and lower-to-higher-layer control-command data compete with each other, the arbitration unit gives a priority to the base device control-command data to be inputted to the control unit that controls the base-driven devices;

first one of the control units disposed on a control layer disposed next to the base device layer, the base inputting devices and the base driven device that are disposed on the base device layer form a base function system;

second one of the control units disposed on layers next to the control layer on which the first one of the control units is disposed receive, via at least one of the lower-to-higher-layer control-command data input portions, distributed data of the base control input data that are inputted from one of the base inputting devices to the first one of the control units and distributed data of the base control-command data that are outputted to the base driven devices to form an automatic control unit that monitors an operating condition of base function system according to the above two distributed data;

the automatic control unit provides the first one of the control units with automatic control-command data as the higher-to-lower-layer control-command data when the operating condition meets a preset condition; and the base function system and the automatic control unit form an automatic expanded function system that determines to output the base control-command data only based on the base control-command data if the automatic control-command data inputted to the first one of the control units stop due to malfunction of any of the automatic control units.

2. An on-vehicle electronic device control system as in claim 1, wherein the lower-to-higher-layer control-command data output portion of one of the control units disposed on one of the control layers distributes output data to the lower-to-higher-layer control-command data input portion of another control unit disposed on a layer higher than said one of the control layers.

3. An on-vehicle electronic device control system as in claim 2, wherein the higher-to-lower-layer control-command data output portion of one of the control units disposed on one of the control layers distributes output data to the higher-to-lower-layer control-command data input portion of another control unit disposed on a layer lower than said one of the control layers.

4. An on-vehicle electronic device control system as in claim 1, wherein each of the control layers includes at least one control unit that has both the higher-to-lower-layer control-command data input portion and the lower-to-higher-layer control-command data output portion.

5. An on-vehicle electronic device control system as in claim 1, wherein at least one of the base inputting devices comprises a manipulating device by which a user provides base inputting data.

6. An on-vehicle electronic device control system as in claim 1, wherein:

another automatic expanded function system is formed from another base function system and another automatic control unit;

one of the control units disposed on a layer higher than the layers on which the another automatic expanded function system is disposed forms a coordinative control unit that receives expanded control condition data that are outputted by the automatic control units to output coordinative operation-command data as the lower-to-higher-layer control-command data, thereby forming a coordinative control system with plural automatic expanded function systems;

if inputting of the coordinative operation-command data stop due to malfunction of any of the coordinative control units, the automatic control units of the coordinative control system that are included in each the automatic expanded function system determines the higher-to-lower-layer control-command data only according to the lower-to-higher-control-command data outputted from the base function system.

7. An on-vehicle electronic device control system as in claim 6, wherein:

the coordinative control system includes a first automatic expanded function system and a second automatic expanded function system;

one of the base inputting devices and one of the base driven devices disposed in the first automatic expanded function system are, respectively, a rear defogger switch and a rear defogger embedded in a rear windshield;

one of the automatic control units disposed in the first automatic expanded function system comprises means for turning off the rear defogger switch if operation time of the rear defogger becomes a preset time;

one of the base inputting devices and one of the base driven devices disposed in the second automatic expanded function system are, respectively, a front defroster switch and a front defroster for blowing warm air to a front windshield; and one of the automatic control units disposed in the second automatic expanded function system comprises means for controlling temperature of the warm air according to outside temperature.

8. An on-vehicle electronic device control system as in claim 7, wherein the coordinative control unit provides the first automatic expanded function system with coordinative operation-command data that indicate coordinative operation of the rear defogger if the expanded control condition data from the second automatic expanded system indicate that the defroster is in operation.

9. An on-vehicle electronic device control system as in claim 7, wherein the coordinative control unit provides the second automatic expanded function with coordinative operation command data to operate the defroster as a replacement of the rear defogger, if the expanded control condition data of the first automatic expanded function system indicate that the rear defogger is not operating while the rear defogger switch is turned on.

10. An on-vehicle electronic device control system including a base device layer on which a plurality of base inputting devices and a plurality of base driven devices are disposed, a plurality of hierarchical control layers which are disposed higher than the base device layer and each of which includes a plurality of control units, wherein:
  each of the control units disposed on a first one of the control layers has a lower-to-higher-layer control-command data input portion for inputting data from a layer that is lower than the first one of the control layers and a higher-to-lower-layer control-command data output portion for outputting control-command data to a layer that is lower than said one layer;
  at least one of the control units disposed on a second one of the control layers has a higher-to-lower-layer control-command data input portion for inputting data from a layer that is higher than the second one of the control layers;
  at least one of the control units disposed on a third one of the control layers has a lower-to-higher-layer control-command data output portion for outputting data to a layer that is higher than the third one of the control layers; and
  one of the control units that has the higher-to-lower-layer control-command data input portion functions as a coordinative control-command unit that determines data to be outputted from the higher-to-lower-layer control-command data output portion thereof based on both data inputted to the higher-to-lower-layer control-command data input portion thereof and data inputted to the lower-to-higher-layer control-command data input portion thereof, and also functions as an autonomous control command unit that determines data to be outputted from the higher-to-lower-layer control-command data output portion thereof based only on the data inputted to the lower-to-higher-layer control-command data input portion thereof if the data to be inputted to the higher-to-lower-layer control-command data input portion thereof are stopped; wherein
  the coordinative control-command unit includes an arbitration unit that exclusively arbitrates to give a priority to one of the higher-to-lower-layer control-command data and the lower-to-higher-layer control-command data according to a preset arbitration rule if the higher-to-lower-layer control-command data and the lower-to-higher-layer control-command data compete with each other;
  first one of the control units disposed on a control layer disposed next to the base device layer, the base inputting devices and the base driven device that are disposed on the base device layer form a base function system;
  second one of the control units disposed on layers next to the control layer on which the first one of the control units is disposed receive, via at least one of the lower-to-higher-layer control-command data input portions, distributed data of the base control input data that are inputted from one of the base inputting devices to the first one of the control units and distributed data of the base control-command data that are outputted to the base driven devices to form an automatic control unit that monitors an operating condition of base function system according to the above two distributed data;
  the automatic control unit provides the first one of the control units with automatic control-command data as the higher-to-lower-layer control-command data when the operating condition meets a preset condition; and
  the base function system and the automatic control unit form an automatic expanded function system that determines to output the base control-command data only based on the base control-command data if the automatic control-command data inputted to the first one of the control units stop due to malfunction of any of the automatic control units.

11. An on-vehicle electronic device control system as in claim 10, wherein the lower-to-higher-layer control-command data output portion of one of the control units disposed on one of the control layers distributes output data to the lower-to-higher-layer control-command data input portion of another control unit disposed on a layer higher than said one of the control layers.

12. An on-vehicle electronic device control system as in claim 11, wherein the higher-to-lower-layer control-command data output portion of one of the control units disposed on one of the control layers distributes output data to the higher-to-lower-layer control-command data input portion of another control unit disposed on a layer lower than said one of the control layers.

13. An on-vehicle electronic device control system as in claim 10, wherein each of the control layers includes at least one control unit that has both the higher-to-lower-layer control-command data input portion and the lower-to-higher-layer control-command data output portion.

14. An on-vehicle electronic device control system as in claim 10, wherein if base device control-command data and lower-to-higher-layer control-command data compete with each other, the arbitration unit gives a priority to the base device control-command data to be inputted to the control unit that controls the base-driven devices.

15. An on-vehicle electronic device control system as in claim 14, wherein at least one of the base inputting devices comprises a manipulating device by which a user provides base inputting data.

16. An on-vehicle electronic device control system as in claim 10, wherein:
  another automatic expanded function system is formed from another base function system and another automatic control unit;
  one of the control units disposed on a layer higher than the layers on which the another automatic expanded function system is disposed forms a coordinative control unit that receives expanded control condition data that are outputted by the automatic control units to output coordinative operation-command data as the lower-to-higher-layer control-command data, thereby forming a coordinative control system with plural automatic expanded function systems;
  if inputting of the coordinative operation-command data stop due to malfunction of any of the coordinative control units, the automatic control units of the coordinative control system that are included in each the automatic expanded function system determines the higher-tolower-layer control-command data only according to the lower-to-higher-control-command data outputted from the base function system.

17. An on-vehicle electronic device control system as in claim 16, wherein:
the coordinative control system includes a first automatic expanded function system and a second automatic expanded function system;
one of the base inputting devices and one of the base driven devices disposed in the first automatic expanded function system are, respectively, a rear defogger switch and a rear defogger embedded in a rear windshield;
one of the automatic control units disposed in the first automatic expanded function system comprises means for turning off the rear defogger switch if operation time of the rear defogger becomes a preset time;
one of the base inputting devices and one of the base driven devices disposed in the second automatic expanded function system are, respectively, a front defroster switch and a front defroster for blowing warm air to a front windshield; and
one of the automatic control units disposed in the second automatic expanded function system comprises means for controlling temperature of the warm air according to outside temperature.

18. An on-vehicle electronic device control system as in claim 17, wherein the coordinative control unit provides the first automatic expanded function system with coordinative operation-command data that indicate coordinative operation of the rear defogger if the expanded control condition data from the second automatic expanded system indicate that the defroster is in operation.

19. An on-vehicle electronic device control system as in claim 17, wherein the coordinative control unit provides the second automatic expanded function with coordinative operation command data to operate the defroster as a replacement of the rear defogger, if the expanded control condition data of the first automatic expanded function system indicate that the rear defogger is not operating while the rear defogger switch is turned on.

* * * * *